March 24, 1942. C. S. ASH 2,277,197
DIRIGIBLE DUAL WHEEL VEHICLE
Filed Aug. 5, 1939 2 Sheets-Sheet 1
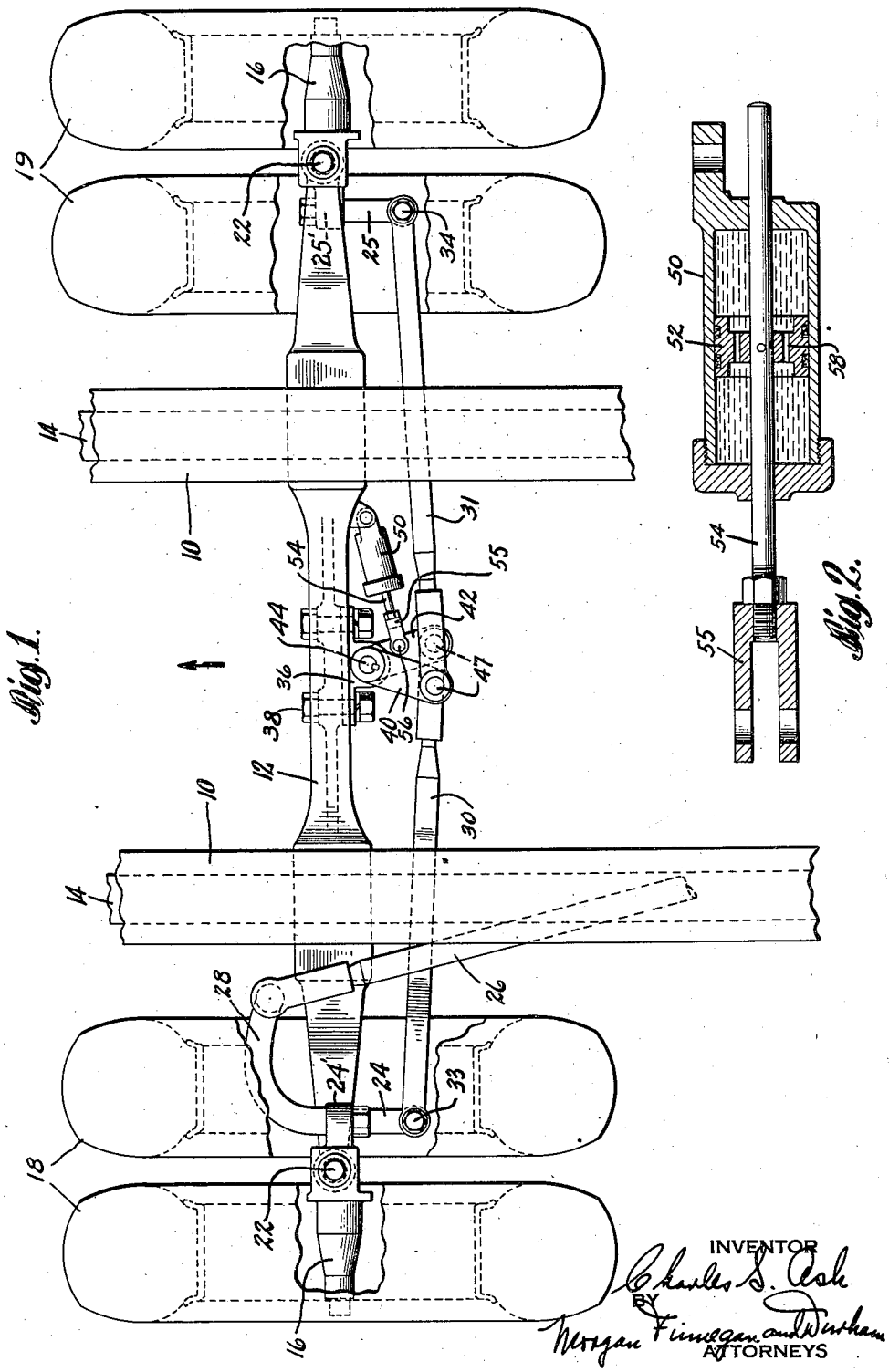
INVENTOR
Charles S. Ash
BY
Morgan Finnegan and Durham
ATTORNEYS March 24, 1942.   C. S. ASH   2,277,197
DIRIGIBLE DUAL WHEEL VEHICLE
Filed Aug. 5, 1939   2 Sheets-Sheet 2
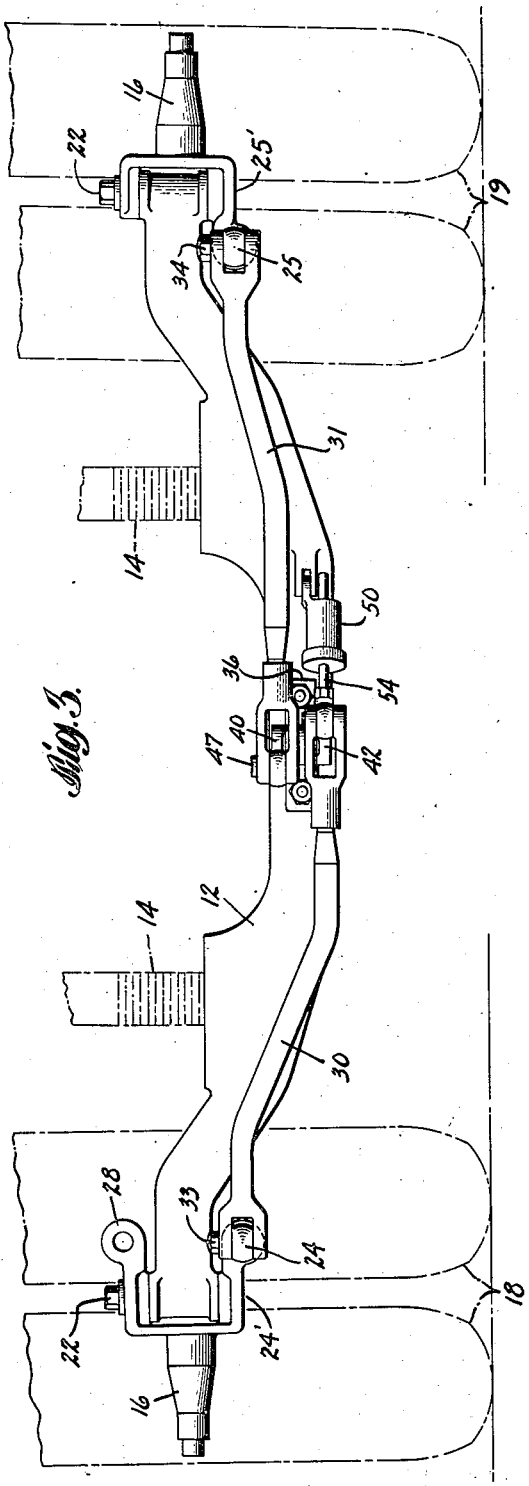
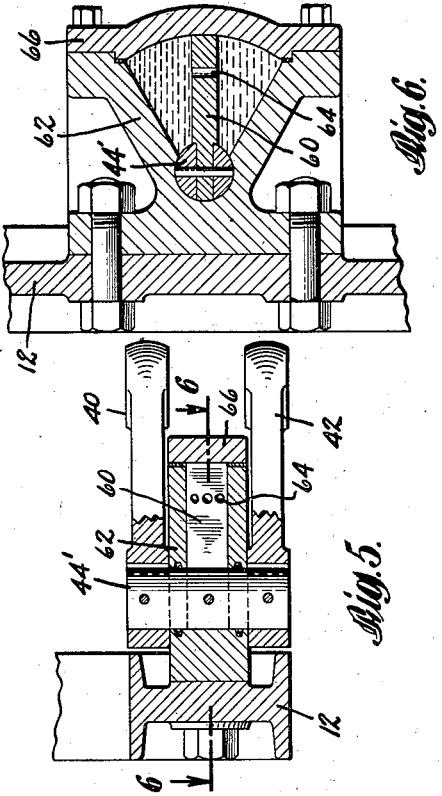
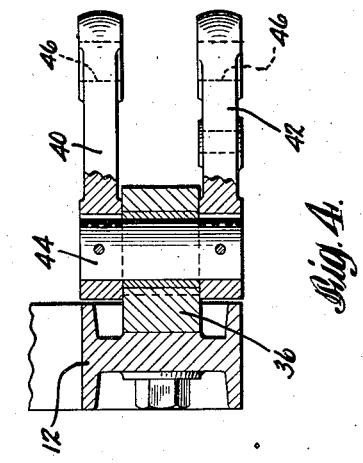
INVENTOR
Charles S. Ash
BY
Morgan Finnegan & Durham
ATTORNEYS Patented Mar. 24, 1942

2,277,197

UNITED STATES PATENT OFFICE 2,277,197

DIRIGIBLE DUAL WHEEL VEHICLE

Charles S. Ash, Milford, Mich.

Application August 5, 1939, Serial No. 288,485

2 Claims. (Cl. 280—95)

The present invention relates to new and useful improvements in the steering mechanism of automotive road vehicles and more particularly to new and useful improvements in the steering of dual wheeled vehicles.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part thereof, illustrate one embodiment of the invention, and together with the description, serve to explain the principles of the invention.

Of the drawings:

Figure 1 is a fragmentary top plan view of a typical and illustrative embodiment of the present invention with certain parts broken away;

Figure 2 is a longitudinal sectional view through the dash pot used as a part of the embodiment of Figure 1;

Figure 3 is a rear elevation of the parts shown in Figure 1;

Figure 4 is a central sectional view through the link connecting means of Figures 1 and 3;

Figure 5 is a central sectional view through a modified embodiment of the link connecting means; and Figure 6 is a sectional view taken on the line 6—6 of Figure 5.

The present invention has for its object the provision of a novel and improved steering mechanism for automotive road vehicles. A further object of the invention is the provision of an improved steering mechanism in which novel and improved means are provided for interconnecting the dirigible wheels so that they are moved for steering at different rates. Still another object of the invention is the provision of a steering mechanism particularly adapted for use with dual wheels, which may be independently rotatable, so constructed that the steering geometry may be easily corrected for vehicles of different wheel-bases. The invention also provides a link mechanism interconnecting the dirigible wheels and having a replaceable part which can be replaced to correct the steering so as to make it correct for all degrees of turning and for all wheel-bases.

In the illustrative embodiment of the invention there are provided dirigible wheels at the front of the vehicle and these wheels may be dual wheels of the independently rotatable type with the king pins or other vertical pivots between the wheels of each dual set, and any desired degree of camber, castor and toe-in may be used. Means are provided for turning the wheels about their king pins or pivots for dirigible movement and according to the present preferred embodiment of the invention comprise link mechanism interconnecting the wheels through the steering knuckles, this link mechanism comprising a pair of links or tie-rods extending substantially parallel to each other from their respective steering knuckles towards the center of the vehicle and being pivotally connected at the center of the vehicle to a pivoted arm or lever device which is pivotally mounted on the front axle or other stationary part. The links preferably overlap at their adjacent ends and are connected on equal radii from the pivot point of the arm or lever device. Means are also provided for transmitting the steering movement from the steering gear to one or the other set of the wheels, and the motion so transmitted to one set of wheels is transmitted through the links and lever device to the other wheel or set of wheels.

Shock absorbing means are preferably provided for restricting sudden movements of the dirigible wheels and this may comprise a double acting dash-pot connected with the link mechanism or directly connected to one arm of the lever device.

Illustratively, the links interconnecting the steering knuckles overlap each other slightly at the center of the vehicle and are connected to separate arms which are coaxially pivoted with their arms in slightly angularly spaced relation so that when the vehicle is being driven straight ahead the right link connecting the right wheel or wheels with the lever device extends from the right steering knuckle to the left of the center line of the vehicle and is connected with the left arm of the lever device, while the left link similarly connects the left wheel or wheels with the right arm of the lever device at the right of the center line of the vehicle. Thus as the vehicle is steered to the left, the left wheel or wheels are turned to the left; the left link is moved further to the right of the vehicle center line about the lever pivot; and the right link is moved closer to the center of the vehicle and transmits its motion to the right wheel or wheels, causing the right wheel or wheels to be moved slightly less than the steering movement of the left wheels and insuring that all of the dirigible wheels remain tangent at all times to their paths of movement.

It will be understood that the foregoing general description and the following detailed description as well, are exemplary and explanatory of the invention but are not restrictive thereof.

Referring now in detail to the illustrative embodiment of the invention as shown in the accompanying drawings, the invention is shown as applied to a vehicle having dual dirigible wheels which are preferably independently rotatable and have their king pins intermediate the wheels in accordance with the disclosure of my prior Patent No. 1,979,598.

The vehicle is supported on the usual frame members 10 at the front of which is provided an axle 12 connected thereto by conventional springs 14, and at the ends of the axle are provided knuckles embodying the outwardly projecting axle spindles 16 on which the independently rotatable dual wheel assemblies 18, 19 are rotatably mounted. The knuckles 16 are pivotally connected to the axles ends by means of the vertical king pins 22 so that the dual wheels may be turned for the steering of the vehicle. These king pins are disposed in planes between the outer and inner wheels of each assembly. Projecting inwardly from the knuckles beneath the adjacent axle ends and into the space bounded by the adjacent inner wheels are crank arms 24', 25', and fixed to and projecting rearwardly from the respective crank arms and lying inwardly and rearwardly of the associated king pins 22 are steering knuckle arms 24, 25 which are disposed with the arms 24', 25' in the spaces bounded by the inner wheels, said arms 24', 25', 24, 25 being fast with respect to the knuckles and by means of which the knuckles may be turned. As the arms 24', 25', 24, 25 are arranged below the plane of the axle ends, which are disposed above the plane of the axle body, provision is made for the proper mounting of such parts of the steering connections below and in rear of the axle ends and within the spaces bounded by the inner wheels of the sets and the arrangement of the tie rods in parallel relation to each other and in the horizontal plane of the axle body, so that said wheels and steering connections may be moved in said spaces through a desired steering angle without interference with each other or from the axle.

The steering of the dual wheels is controlled from the conventional steering gear (not shown) by means of the pitman rod 26 which is pivotally connected at its front end to the steering arm 28 which is also connected to the steering knuckle arm 24 so that as the pitman is moved forwardly or back, the left dual wheels are moved clockwise or counter-clockwise, respectively.

For moving the right dual wheels as the left dual wheels are dirigibly moved, link means are provided interconnecting the steering knuckle arms and for this purpose there are provided the tie rods 30, 31 which extend towards each other in substantial parallelism. Tie rod 30 is pivotally connected at its outer end to the rear of steering knuckle arm 24 by means of the pivot pin 33, while tie rod 31 is similarly connected to the rear end of steering knuckle arm 25 by means of the pivot pin 34. Means are provided for interconnecting the adjacent ends of the tie rods 30 and 31 and for moving one by the other at substantially equal, but slightly different rates and these means comprise a double armed lever pivotally mounted at the rear central portion of the front axle 12 in the pivot block 36 which is securely bolted to the axle by bolts 38. This lever comprises an upper arm 40 and a lower arm 42 coaxially pivoted by means of the pivot shaft 44 journalled in the pivot block 36 and to which the arms are both pinned and keyed, one arm being above the pivot block 36 while the other arm is below the pivot block. Arms 40 and 42 are provided at their ends with holes 46 to receive the pivot pins 47 by which the arms are connected to the forked ends of the tie rods 30 and 31.

Arms 40 and 42 are angularly spaced from each other, and the arm 40 connected to the right tie rod 31 extends slightly to the left of the center line of the vehicle while the arm 42 connected to the left tie rod 30 extends slightly to the right of the center line of the vehicle. Thus, the arms are always maintained at a definite angular spacing and the ends of the tie rods 30 and 31 are always spaced apart a constant distance, but the rate at which the perpendicular distance from one pivot pin to the center line of the vehicle changes is different from that at which the perpendicular distance of the other pivot pin changes.

In other words, as the left wheels are turned to the left, tie rod 30 moves to the right rotating the arms 40 and 42 counter-clockwise a corresponding amount, and at the same time moving the tie rod 31 to the right so as to move the right wheels similarly to the left. When steering left from a straight-ahead position, the tie rod 30 moves the arm 42 away from the center line of the vehicle and moves the arm 40 towards the center line of the vehicle so that continued movement of the tie rod 30 produces a greater and greater angular movement of the pivoted arms 40 and 42, and at the same time produces a smaller movement of the tie rod 31 as this tie rod is approaching the center line. This variable ratio in the linkage between the wheels coupled with the fact that the pivots 33 and 34 are spaced inwardly from their respective king pins, make it possible for the wheels always to remain normal to their respective turning radii as the vehicle is steered and insure correct tracking of the several dirigible wheels.

By substituting differently spaced arms 40 and 42 for those shown, different wheel bases can be provided for correctly, without modification of the dimensions, spacing and other factors of the king pins and pivots 33 and 34.

Means are provided for absorbing the road shocks transmitted to the steering mechanism, as well as for preventing instability in the steering, so that severe road shocks, blow-outs, etc., cannot cause a sudden dirigible movement of the wheels. For this purpose, a double acting dash pot is connected to the tie rods, and as embodied in Figures 1, 2 and 3, the dash pot comprises a cylinder 50 pivotally anchored to the rear of the front axle 12 and provided with a piston 52 connected to a slidable piston rod 54 at one end of which is a clevis 55 and pivot 56 by which the piston rod is connected to one of the arms 40, 42. The piston is provided with small apertures 58 permitting a restricted flow of the oil or other liquid from one side of the piston to the other while at the same time obstructing sudden movements of the piston in either direction. For normal steering the holes are of sufficient size to permit the steering to take place without unusual exertion.

Figures 5 and 6 illustrate a modified form of dash pot combined with the angularly spaced arms 40 and 42 and as embodied, the pivot shaft 44' on which the arms 40 and 42 are mounted is also provided with a radial vane 60 which divides the segmental chamber 62 into two parts communicating with each other only through the apertures 64 in the vane. A cover plate 66 is provided to retain the oil or liquid within the segmental chamber and at the same time contacts with the end of the vane 60 so as to form a seal therewith. As the arms 40 and 42 are turned, vane 60 is similarly turned and oil is forced from one portion of the segmental chamber into the other portion.

The invention in its broader aspects is not limited to the specific mechanisms shown and described but departures may be made therefrom within the scope of the accompanying claims without departing from the principles of the invention and without sacrificing its chief advantages.

What I claim is:

1. In a road vehicle steering mechanism, a drop axle having end portions disposed above the plane of the axle body, a pair of coaxial inner and outer wheels at each side of the vehicle, the inner wheel of each pair being arranged to rotate about the adjacent end of the axle, a dirigible mounting for each set of wheels including a stub axle pivotally connected with the adjacent end of the axle by a substantially vertical king pin disposed in a plane between the outer and inner wheels of the set, a pair of tie rods pivotally connected to said dirigible mountings below the plane of the ends of the axles and inwardly and rearwardly of said king pins and within the planes of the inner wheels, and a pivoted member to which the tie rods are pivotally interconnected in overlapping relation, said links being mounted by the pivotal connections substantially in the horizontal plane of the axle body and substantially parallel to each other.

2. In a road vehicle provided with a drop axle having end portions located above the plane of the axle body, and two pairs of inner and outer wheels, one at each end of the axle, the inner wheel of each pair being arranged to rotate about the adjacent end of the axle, steering knuckles provided with spindles supporting the pairs of wheels, substantially vertical pivots connecting said knuckles to the axle ends, said pivots being disposed in planes between the outer and inner wheels of the pairs, crank arms extending inwardly from the knuckles below the axle ends and within the spaces bounded by the inner wheels, steering arms connected to the crank arms and extending therefrom rearwardly and inwardly of the vertical pivots, a pair of tie rods extending toward each other and having forked outer ends pivotally connected to the steering arms at points spaced longitudinally and inwardly from the vertical pivots and within the planes of the inner wheels for simultaneous dirigible movement of the knuckles, a bracket member on the axle, a vertically disposed pivot pin carried by said bracket member, and links connected at their inner ends to said pivot pin above and below the bracket member and extending rearwardly from the pivot pin in divergent relation to each other, said tie rods being arranged substantially in the horizontal plane of the axle body and in parallel relation to each other and having forked inner ends pivotally connected in overlapping relation to each other with the outer ends of the links.

CHARLES S. ASH.